(12) United States Patent
Fukushima (10) Patent No.: US 8,144,567 B2
(45) Date of Patent: Mar. 27, 2012

(54) OPTICAL DISC AND OPTICAL DISC APPARATUS

(75) Inventor: Akio Fukushima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 12/465,111

(22) Filed: May 13, 2009

(65) Prior Publication Data

US 2009/0290480 A1    Nov. 26, 2009

(30) Foreign Application Priority Data

May 20, 2008   (JP) .................................. 2008-131456

(51) Int. Cl.
*G11B 7/24* (2006.01)
(52) U.S. Cl. ..................... 369/275.4; 369/275.1; 369/94
(58) Field of Classification Search .................. None
See application file for complete search history.

(56) References Cited

U.S. PATENT DOCUMENTS 6,009,070 A * 12/1999 Higuchi et al. ............. 369/275.1
2006/0158974 A1* 7/2006 Kobayashi et al. .......... 369/44.32

FOREIGN PATENT DOCUMENTS

| JP | 2004-062976 | 2/2004 |
| JP | 2005-332493 | 12/2005 |
| JP | 2007-004951 | 1/2007 |

* cited by examiner

*Primary Examiner* — Joseph Haley
*Assistant Examiner* — Ifedayo Iluyomade
(74) *Attorney, Agent, or Firm* — McDermott Will & Emery LLP (57) ABSTRACT

A multilayer optical disc has dimples and/or bumps on a surface of at least one of the layers. Dimensions of the dimples and/or bumps, such as size, frequency and pitch, are selected to generate frequency components in light reflected from the surface that are different from frequency of servo and/or information signals. A disc drive can then use an appropriate filter to remove signals produced by light reflections of an unintended layer.

13 Claims, 5 Drawing Sheets

EXAMPLES OF DIMPLE AND BUMP ARRANGEMENT
(LEFT: RANDOM ARRANGEMENT,
MIDDLE: HEXAGONAL ARRANGEMENT,
RIGHT: RECTANGULAR ARRANGEMENT)

OPTICAL DISC AND OPTICAL DISC APPARATUS

BACKGROUND

The present examples relate to multilayer optical discs and to an optical disc apparatus applicable to a multilayer optical disc.

Media families such as DVDs, Blu-ray discs, and HD DVDs, are known which has multilayer optical discs. These multilayer optical discs are two-layer discs defined by the relevant standards for current products. In the meantime, as described in "2006 Optical Data Storage Topical Meeting Conference Proceedings (pp 123-125, pp 185-187)", for example, researches on four-layer and six-layer optical discs are underway.

Also, the techniques disclosed in JP-A-2004-62976 and JP-A-2005-332493 are known as the background art related to the present example. Methods of manufacturing a multilayer optical disc are described in these patent application publications. In addition, a multilayer optical information-recording medium that has preferable reproduction signal quality is described in JP-A-2007-004951.

SUMMARY

For information recording on or information reproduction from a multilayer optical disc, signal light that has been reflected from an information-recording layer (hereinafter, referred to as the intended layer) on which the information recording or reproduction operation is to be performed is used to generate a servo control signal, which is then used to position the optical spot of the light accurately at a desired position on the intended layer by positioning control and record the information at or reproduce the information from the desired position.

At this time, it is desirable that only light that has further reflected from the intended layer (hereinafter, this light is referred to as the intended light) should be used as the servo signal light for generating the servo control signal. In reality, however, light that has reflected from other information-recording layers (hereinafter, referred to as non-intended layers), that is, non-intended layer light is superimposed upon the intended light. In addition, it is desirable that only the intended light be used as the reproduction signal light for reproducing the information of the intended layer, but in reality, non-intended layer light becomes superimposed.

The influences of non-intended layer light upon the intended light will occur as follows.

Coherent light that has been emitted from the semiconductor laser of an optical pickup is reflected by different signal-recording layers of the multilayer optical disc, and then the beams reflected by these signal-recording layers are superposed at the surface of a photodetector within the optical pickup. In the above multilayer optical discs, it is presumed from the specifications and other factors of existing two-layer discs that the clearances between the intended layer and non-intended layers adjacent thereto (hereinafter, referred to simply as the clearances between adjacent layers) range from about 10 μm to about 30 μm. Similarly, variations in the clearance between any two adjacent layers are estimated to range from about several hundreds of nanometers (nm) to about a few micrometers (μm). The wavelength of the light emitted from the semiconductor laser is about 405 nm in both Blu-ray and HD DVD types.

The multiple beams of light reflected from different signal-recording layers have a phase difference determined by the wavelength of the light source, the twofold length of the clearance between adjacent layers, and the refractive index of the medium between the adjacent layers. These multiple beams reflected from different signal-recording layers are substantially of the same wavelength and have the relationship that the phase differences between the beams vary with the respective clearances between adjacent layers. Thus, the superimposition of the beams at the surface of the photodetector causes interference and thus result in the occurrence of differences in contrast level on the photodetector according to the particular phase differences of the beams. As discussed above, the differences in contrast level due to the changes in the clearance between adjacent layers make the non-intended layer light affect the intended light.

Since optical disc drives detect a servo control signal and a reproduction signal from intended light and conduct a servo control operation and an information-reproducing operation upon the intended layer, the non-intended layer light superimposed on the intended light obstructs the operations upon the intended layer. That is to say, the presence of too many components of non-intended layer light in the servo control signal causes the instability of servo positioning, and the presence of too many components of non-intended layer light in the reproduction signal light increases reproduction signal-processing error rates.

For these reasons, in order to reduce the non-intended layer light that causes the obstruction, optical pickups applicable to Blu-ray two-layer discs, for example, contain optical design considerations such as shielding the non-intended layer light.

In actual optical pickups, however, it is difficult to completely exclude the influences of the non-intended layer light without affecting the intended light. Accordingly, even an optical disc drive applicable to a Blu-ray two-layer disc, for example, reduces the influences of the non-intended layer light are reduced to a level as low as practically achievable.

The ratio of the luminous intensity of the non-intended layer light to that of the intended light acts as a measure of the magnitude of the influence of the former light upon the latter. In general, in multilayer discs, as the number of layers increases, the luminous intensity of the intended light decreases, whereas the sum of the luminous intensity of the non-intended layer light increases. Accordingly, as the number of layers increases, the ratio in luminous intensity between both kinds of light increases and the degree of the influence (obstruction) augments.

Controlling the occurrence of contrast fluctuation due to the interference of the non-intended layer light, therefore, is considered to be an effective method for reducing the influences of the non-intended layer light upon the servo control signal and reproduction signal developed in the multilayer optical disc. However, above Patent Documents 1 and 2 give no consideration to such control.

Hence, there is a need to provide a multilayer optical disc improved in ease of use, and an optical disc apparatus adaptable to the multilayer optical disc. The present examples are intended to reduce interference of non-intended layer light reflections with servo signal light which is used to generate a servo control signal at an intended layer, and with reproduction signal light which is used to reproduce information of the intended layer.

The above need can be achieved by, for example, providing required dimples and/or bumps on the surface of a spacer layer disposed between information-recording layers, and dimensionally controlling the dimples and/or bumps on the surface. In another example, dimples and/or bumps are provided on the surface of an information recording layer disposed on the spacer layer.

A multilayer optical disc minimized in interlayer interference, and an optical disc apparatus adaptable to the multilayer optical disc can be provided according to the present examples.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Hereunder, embodiments of the present invention will be described using the accompanying drawings.

First Embodiment

A first embodiment of the present invention is described below using the accompanying drawings.

Figure 1:
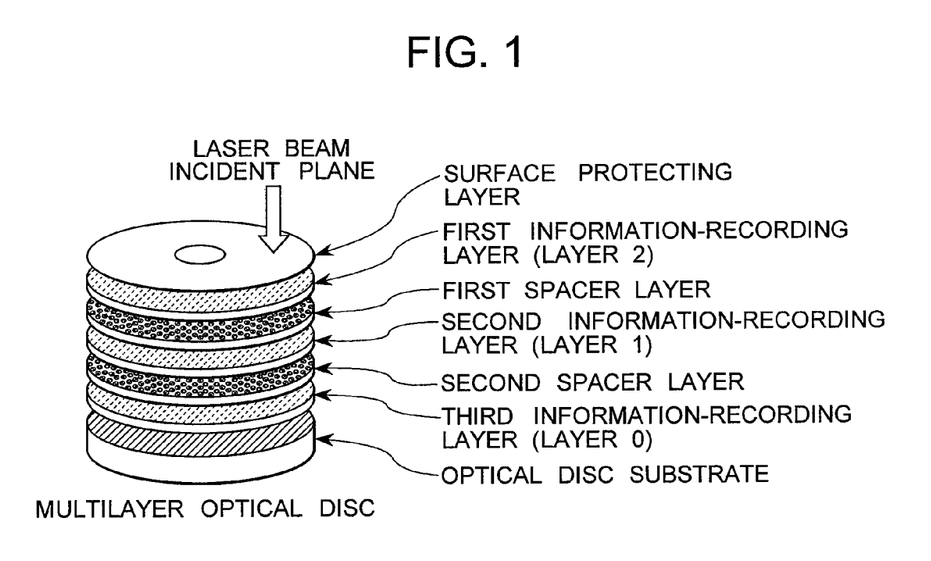
FIG. 1 is a schematic diagram illustrating the multilayer optical disc of a first embodiment.

FIG. 1 is a schematic diagram of a multilayer optical disc which is the first embodiment and includes three information-recording layers and two spacer layers. The disc has a structure with an alternate arrangement of the information-recording layers and the spacer layers. In order from an incident plane of laser light for recording or reproducing information, a surface-protecting layer, a first information-recording layer (Layer 2), a first spacer layer, a second information-recording layer (Layer 1), a second spacer layer, a third information-recording layer (Layer 0), and an optical disc substrate are arranged in a vertical direction. A recording layer composed of organic dyes or an inorganic phase-change material, for example, and layers such as a dielectric layer, reflecting layer, and heat control layer, that are arranged in proximity to the recording layer as necessary, are involved in the recording of information on an actual optical disc and the reproduction of recorded information from the optical disc. Herein, a combination of layers including the recording layer, the dielectric layer, the reflecting layer, the heat control layer, etc., is collectively termed an information-recording layer in the present embodiment.

While the multilayer optical disc having three information-recording layers is described by way of example in the present embodiment, the number of information-recording layers is not limited to three and the optical disc may be, for example, a four-layer optical disc having four information-recording layers and three spacer layers, or any other optical disc having a layer structure with an alternate arrangement of information-recording layers and spacer layers.

In terms of composition, structure, layout, and the like, the information-recording layers and the constituent sublayers thereof do not have a direct relationship with the present embodiment, so a compositional, structural, or configurational description of these layers is omitted herein.

Next, a manufacturing process for the multilayer optical disc of the present embodiment is described below taking a recordable type of optical disc as an example. Since the present embodiment does not have a direct relationship with respect to detailed manufacturing conditions and process of the optical disc, a conceptual description of the manufacturing process is confined to giving a brief account of an example.

(1) A specific die is manufactured for Layers 0, 1, and 2 each, and the die is used to form a stamper for each Layer.

(2) Next, the stamper for Layer 0 is used to mold an optical disc substrate.

(3) After a recording layer and a reflecting layer, both for Layer 0, have been formed on the molded substrate, a second spacer layer is stacked by spin coating with an ultraviolet-curable resin.

(4) The stamper for Layer 1 is pressed against the second spacer layer, and then molded by ultraviolet irradiation.

(5) After a recording layer and a reflecting layer, both for Layer 1, have been formed on the molded second spacer layer, a first spacer layer is stacked by spin coating with an ultraviolet-curable resin.

(6) The stamper for Layer 2 is pressed against the first spacer layer, and then molded by ultraviolet irradiation.

(7) After a recording layer and a reflecting layer, both for Layer 2, have been formed on the molded first spacer layer, a first surface-protecting layer is stacked by spin coating with an ultraviolet-curable resin.

In this way, a multilayer optical disc having three information-recording layer and two spacer layers can be created.

Figure 2:
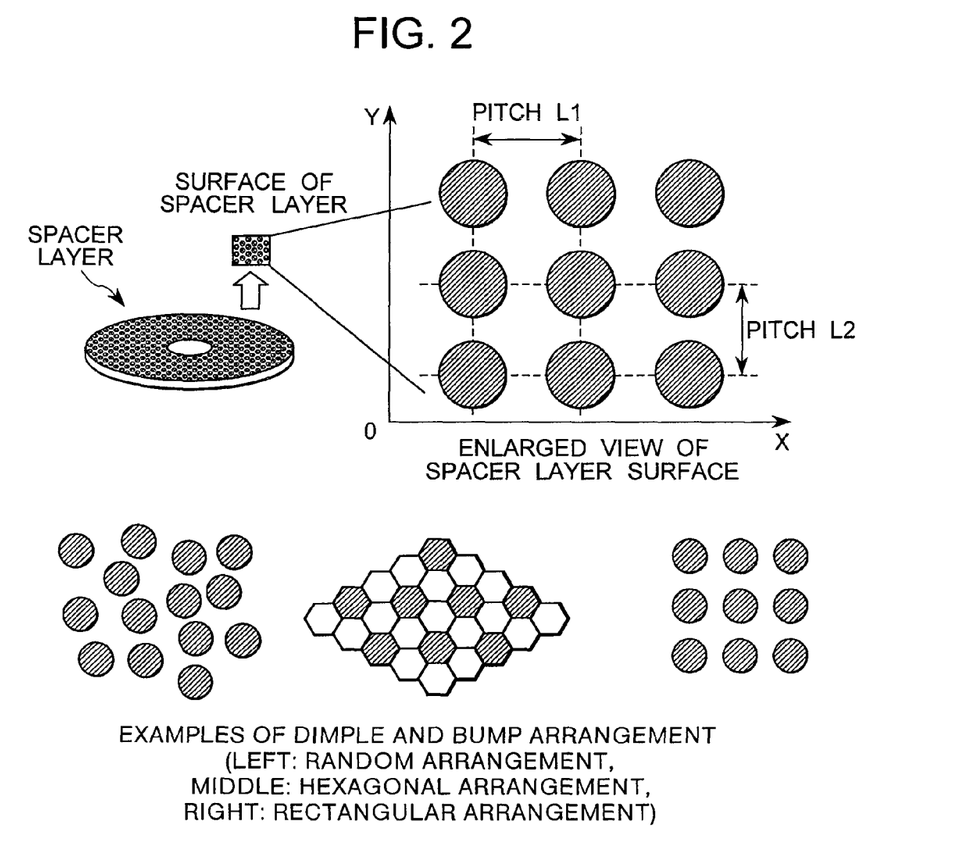
FIG. 2 is a schematic diagram illustrating the spacer layer provided in the first embodiment.

FIG. 2 is a schematic diagram illustrating a spacer layer provided in the first embodiment. The spacer layer has dimples and/or bumps on its surface, and as denoted by a graph representing a relationship between X and Y, the dimples and the bumps are pitched at L1 in a direction of an X-axis and L2 in a direction of a Y-axis. The directions of X, Y are in an arbitrary relationship with respect to a direction of the disc. For the sake of convenience in description, a coordinate system consisting of the orthogonal X-axis and Y-axis is used in the present embodiment, but the present invention is not limited to this coordinate system and L1, L2, for example, may be defined in a polar coordinate system or any other two-dimensional coordinate system.

As discussed earlier herein, the problem of interference due to non-intended layer light on a multilayer optical disc is caused by the interference of the optical beams having different phase relationships, these optical beams having been reflected from the plurality of reflecting layers including an intended layer and non-intended layers. Any influences of the interference can therefore be reduced by providing control so that the signals required for the optical disc drive will not be affected by a change in phase difference of either the intended layer light or the non-intended layer light with respect to the other. In the present embodiment, therefore, mutual phase fluctuation frequencies of the beams reflected from the first information-recording layer and the second information-recording layer will be controlled to fall outside frequency bands of the signals required for the optical disc drive.

More specifically, in a stamper used for molding a surface on which at least either the optical disc substrate, the second spacer layer, or the first spacer layer comes into contact with either of the first to third information-recording layers, the dimpled and bumped structure that the present invention proposes is superimposed upon a molding pattern that has been traditionally employed for stampers. The surface having this dimpled and bumped structure is also transferred to the surface of the information-recording layer in contact with that surface, with the result that the dimpled and bumped structure is also generated on the surface of the information-recording layer.

For example, layout of the dimples and/or bumps in the present embodiment can be either a rectangular arrangement with the dimples and/or bumps arranged at vertexes of a quadrangle, a hexagonal arrangement with a regular hexagon laid out on a plane, any other arrangement substantially similar to one of the former two shapes, or otherwise, or random arrangement. FIG. 2 shows examples of random, hexagonal, and rectangular arrangements. In the present invention, the information-recording layers with dimples and/or bumps on the surface are formed in this way, and the influences of interlayer interference are minimized by imparting a desired phase difference to the light reflected from the surfaces of the information-recording layers, according to the particular dimpled and/or bumped shape of the surface.

Next, a method of controlling the phase fluctuation frequencies of the beams to fall outside the frequency bands of the signals required for the optical disc drive is described below. First, an appropriate size of each dimple and/or bump is set for a size of an optical spot.

Suppose that the frequency of the signal generated when the optical spot crosses a phase change region is "f", that a linear velocity at which the optical spot moves with rotation of the optical disc is "V", and that the dimples and/or the bumps are arranged at equal pitches (L1 in the direction of the X-axis, and L2 in the direction of the Y-axis). A period at which the optical spot crosses the phase change region becomes a maximum when the optical spot travels in a direction that constitutes a diagonal line. If length of the diagonal line at this time is defined as L, the following expression holds:

$$L\max=\sqrt{(L1)^2+(L2)^2} \quad \text{(Expression 5)}$$

If a minimum value of the frequency "f" is defined as "fmin", it follows that:

$$f\min=V/L\max \quad \text{(Expression 6)}$$

Similarly, defining L1 or L2, whichever is the smaller, as "Lmin", and a maximum value of "f", as fmax, allows one to have:

$$f\max=V/L\min \quad \text{(Expression 7)}$$

Hence, the signal fluctuation frequency components occurring in the present embodiment are limited to a frequency range from "fmin" to "fmax". Therefore, L1, L2, and V are set so that the frequency bands of the servo control signal and reproduction signal required for the optical disc drive will meet conditions under which the bands become less than "fmin" or exceed "fmax".

The above is described in further detail below using examples of data.

For example, assume a standard velocity in Blu-ray disc specifications and suppose that the frequency band of the servo control signal ranges from a DC to 20 kHz and that the frequency band of the reproduction signal ranges from 200 kHz to 33 MHz. The supposed frequencies are values deemed to be appropriate for Blu-ray disc drives. In this example, it follows that fmax=200 kHz and fmin=20 kHz. In addition, since V=5.28 m/s, it can be seen from expressions 6 and 7 that if Lmax=264 μm and Lmin=26.4 μm, the control described above can be implemented. Therefore, if the dimples and/or the bumps are arranged to obtain L1=L2=100 μm, for example, then Lmax=141 μm and Lmin=100 μm are derived and thus the above conditions can be satisfied.

Next, a method of generating required phase fluctuations in reflected light according to the dimples and/or bumps provided on the surface of a spacer layer is described below.

Figure 3:
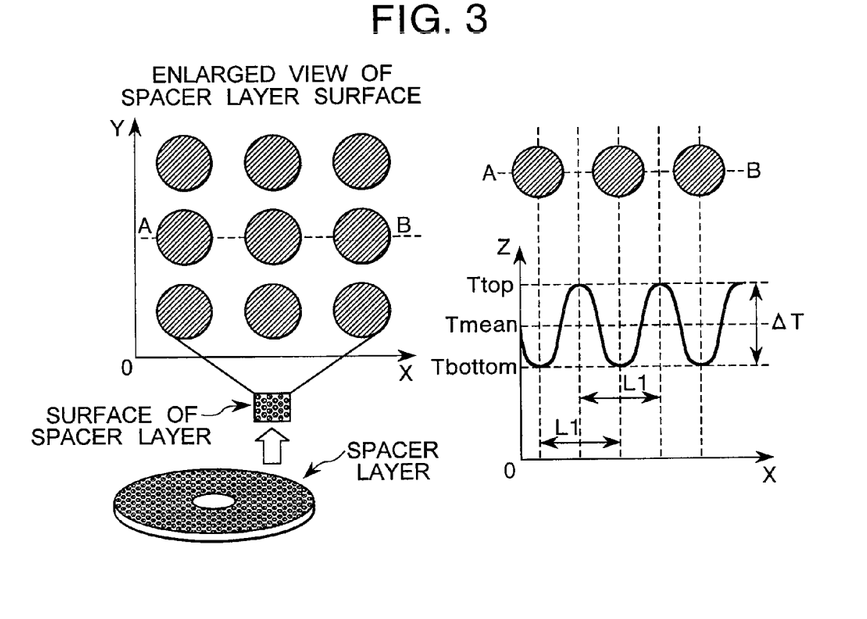
FIG. 3 is a schematic diagram illustrating the spacer layer formed in the first embodiment.

FIG. 3 is a schematic diagram illustrating the spacer layer formed in the first embodiment. A graph representing a relationship between X and Z shows how, when an XY plane is defined as a reference surface for a Z-axis direction, the surface of the spacer layer changes in shape in a direction of thickness (i.e., the Z-axis direction), near a cross section of line segment A-B. If the dimpled and/or bumped portions in the dimpled and/or bumped surface structure of the spacer layer differ by $\Delta T$ in height or depth, $\Delta T$ can be expressed as follows:

$$\Delta T = T\text{top} - T\text{bottom} \quad \text{(Expression 14)}$$

In FIG. 3, the dimples existing when Z is Tmean or less are shown in hatched form to make the figure better understandable, which also applies to other figures. If the wavelength of the light used for recording information on the optical disc or for reproducing recorded information therefrom is taken as "λ", $\Delta T$ can be expressed as follows from the conditions under which the difference in phase between the beam reflected from a bump, and the beam reflected from a dimple, becomes λ/2 and causes interference between both beams:

$$\Delta T = \lambda/4 \quad \text{(Expression 15)}$$

where $\Delta T$ is a very small value of about 100 nm, $\Delta T$ being difficult to control accurately during manufacture of the optical disc. During actual manufacture, $\Delta T$ needs only to stay within a required range that causes the interference between the above two kinds of reflected beams. More specifically, an error of about λ/8 is considered to be within an allowable range, so even if $$\lambda/8 \leq \Delta T \leq 3\lambda/8 \quad \text{(Expression 16)}$$

this $\Delta T$ value is practically allowable. In addition, $\Delta T$ can take a value obtained when an offset equal to an integral multiple of λ is assigned to the phase difference caused by $\Delta T$. That is to say, $\Delta T$ can take any value satisfying the following expression:

$$(\lambda/8)+n\lambda \leq \Delta T \leq (3\lambda/8)+n\lambda \quad \text{(Expression 17)}$$

where "n" is a natural number and "λ" is a value that allows for a refractive index of the medium.

Furthermore, although FIG. 3 shows an example in which ΔT changes in substantially sinusoidal form with respect to a change in X, the change in ΔT is not limited to this signal waveform and can take a rectangular or triangular waveform with respect to the change in X.

Next, association of information-recording pits formed on the surfaces of read-only memory (ROM) discs, tracks and wobbles formed on recordable discs, and other shape-related elements present on the surfaces of the recording layers existing on conventional optical discs, with respect to the dimpled and/or bumped shape that the present invention proposes, will be described.

These shape-related elements traditionally present on the surfaces of the recording layers are also formed as the dimples and/or bumps in information-recording layers, so each such element has association with the dimpled and/or bumped shape that the present invention proposes. Since information-recording pits, tracks, and wobbles each generate a signal using the interference of light, approximate heights (depths) of each dimple or bump range from $\lambda/8$ to $\lambda/4$ and are substantially equal to those of the dimples and/or bumps in the information-recording layers presented in the present invention. However, as described above, the size of each of the dimples and/or bumps on the spacer layer surface of the present invention is as large as about 100 μm, whereas the information-recording pits in Blu-ray disc specifications are about 0.13 μm in diameter, at the minimum, and track groove pitches are about 0.32 μm wide, which is at least 1/300 times as small as the size of each of the dimples and/or bumps in the present invention. As discussed above, both signal frequencies are separable on the frequency axis, so neither affects each other and thus, no problem arises. The same also applies to optical disc drives applicable to the optical disc of the present invention; no problem will occur in the optical disc since, as will be described in a third embodiment, a filter for removing any frequency components caused by the dimples and/or bumps which the present invention presents is disposed in a servo control signal circuit and a reproduction signal circuit.

As set forth above, interlayer interference can be reduced by constructing the multilayer optical disc of the dimpled and/or bumped structure proposed in the present embodiment.

While an optical disc with three information-recording layers has been described by way of example in the present embodiment, mutual relationships in position among the dimpled and/or bumped information-recording layers are not specified and are arbitrary. That is to say, dimples and/or bumps may need only to exist on at least one information-recording layer. However, if dimples and/or bumps exist on one information-recording layer only and do not exist on the other two information-recording layers, this state is undesirable since interference occurs between the beams reflected from the non-dimpled/bumped information-recording layers. In perspective of the point of the present invention, therefore, it is desirable that non-dimpled/bumped information-recording layer should be maximum one and that any one of layer set combinations of two information-recording layers containing at least one dimpled and/or bumped information-recording layer. In another method, even if at least two non-dimpled/bumped information-recording layers are present, a magnitude of the interference can be reduced by disposing a non-dimpled/bumped information-recording layer so as to increase a layout spacing of those non-dimpled/bumped information-recording layers. In an optical disc with three information-recording layers, for example, a dimpled and/or bumped information-recording layer is disposed vertically as a middle layer of the three information-recording layers, and non-dimpled/bumped information-recording layers are disposed as the remaining upper and lower information-recording layers. Arranging the information-recording layers in this way extends the spacing between the two non-dimpled/bumped information-recording layers in which the interference easily occurs. Since the extension of the spacing increases an area of each information-recording layer reflecting the interfering light, energy density of the interfering light on the surface of the photodetector decreases, which results in reduced influences of the interference.

Next, a method in which a usage form appropriate for the present embodiment can be realized by discriminating between an optical disc that applies the embodiment, and an optical disc that does not apply the embodiment, will be described.

First, discrimination information for discriminating an optical disc applicable to the embodiment is recorded on a predetermined information-recording region of the optical disc in a form readable to the optical disc drive. A manufacturer of the optical disc commonly records the discrimination information before shipping the disc.

A method of recording the discrimination information is not limited to the above. For example, in an optical disc drive that has the corresponding optical disc mounted therein and is adapted for recording information on the disc, after the optical disc drive has recognized the optical disc applying the present embodiment, the discrimination information may be recorded in the predetermined information-recording region of the optical disc in appropriate timing in the form readable to the optical disc drive. In this case, the optical disc drive uses an arbitrary method to recognize that the optical disc mounted in the drive is that to which the embodiment is applied. However, the optical disc drive can judge, for example, from the frequencies, levels, or other factors of the characteristic signals of the embodiment that are generated according to the particular dimpled and/or bumped shape of the information-recording surface.

The information-recording region on the optical disc where the discrimination information is recorded is, for example, a region in which management information of the optical disc is recorded.

In addition, the discrimination information recorded in the information-recording region relates to dimples and/or bumps and includes, for example, at least one of the following information:

(1) information intended to discriminate whether the optical disc includes dimples and/or bumps, and relating to
    (a) presence of at least one dimpled and/or bumped information-recording surface on the optical disc, or
    (b) presence of no dimpled or bumped information-recording surfaces;

(2) information intended to discriminate a dimpled and/or bumped information-recording surface from a plurality of information-recording surfaces, and including a layer characteristic number and other layer-discriminating information relating to either
    (a) a dimpled and/or bumped information-recording layer, or
    (b) a non-dimpled and/or bumped information-recording layer; and (3) information relating to characteristics of the filter for separating the signal frequencies generated by the presence of dimples and/or bumps, and more particularly, to
    (a) sizes and layout pitches of the dimples and/or the bumps, or (b) the signal frequencies or signal periods generated at specific speeds of the optical disc by the presence of the dimples and/or the bumps.

Next, the form in which the discrimination information is recorded on the optical disc that applies the present embodiment is described below. The present embodiment assumes that, as described above, the discrimination information is recorded on the predetermined information-recording region of the optical disc in the form readable to the optical disc drive. The information-recording region where the discrimination information is recorded, therefore, can be, for example, a burst cutting area, a lead-in section, a read-out section, a user data section, or the like. However, the discrimination information is considered to be of such a nature that the manufacturer of the optical disc should record as the management information of the optical disc. Using the user data section, therefore, is not desirable. Instead, using the burst cutting area, the lead-in section, or the read-out section is desirable.

Figure 6:
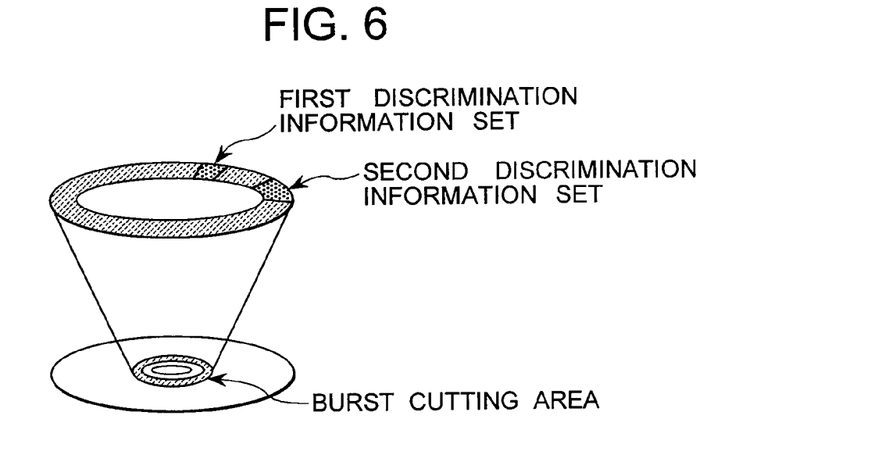
FIG. 6 is a schematic diagram illustrating a configuration of the management information recorded in a burst cutting area of the multilayer optical disc of the first embodiment.
Figure 7:
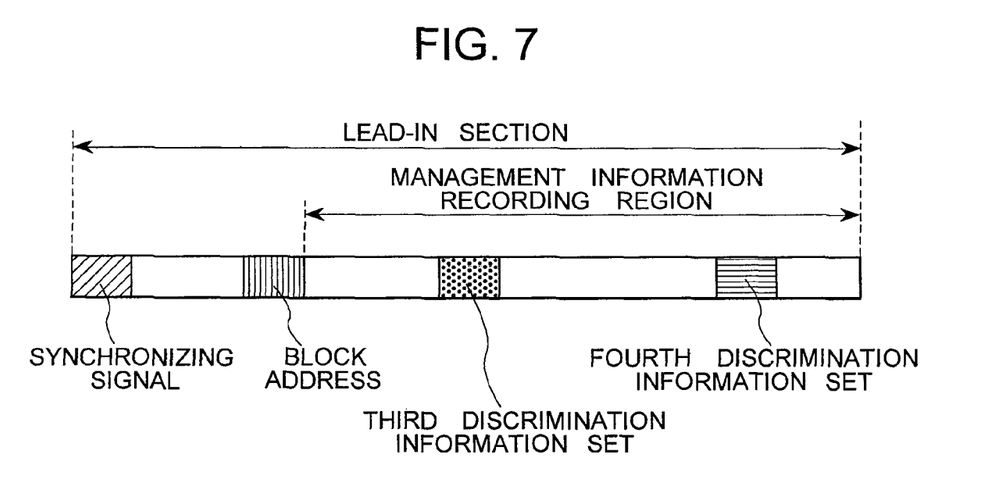
FIG. 7 is a schematic diagram illustrating a configuration of the management information recorded in a lead-in section of the multilayer optical disc of the first embodiment.

FIGS. 6 and 7 are schematic diagrams showing an example of disposing discrimination information to be recorded in the burst cutting area and the lead-in section, respectively, in the first embodiment.

For example, for recording a first set of discrimination information and a second set of discrimination information in the burst cutting area, layout, formats, and other factors of the discrimination information sets are determined in advance to avoid discrepancies from existing information to be recorded in the burst cutting area. In addition, for recording a third set of discrimination information and a fourth set of discrimination information in the lead-in section, the layout, formats, and other factors of these discrimination information sets are determined in advance to avoid discrepancies from existing information to be recorded in the lead-in section. Discrimination information recording in both the burst cutting area and the lead-in section may take place, in which case, the two sets of discrimination information need to be free from discrepancies from each other in contents and to be of the same contents for the same item.

The above-described method of providing dimples and/or bumps on the surface of each information-recording layer is by forming dimples and/or bumps on each spacer layer and then forming the information-recording layer on the spacer layer. However, the object of the present invention can be achieved by forming a dimpled and/or bumped shape on the surface of the information-recording layer, and how the dimples and/or the bumps are formed is not limited to the above-described method.

More specifically, in the above-described method, which allows for actual disc-manufacturing process steps, the surface of each information-recording layer is dimpled and/or bumped by forming a spacer layer whose surface was dimpled and/or bumped by transfer from a dimpled and/or bumped stamper, and then further forming the information-recording layer on the dimpled and/or bumped spacer layer. This method is characterized in that since the number of stamping steps required is substantially the same as in an manufacturing process for an existing disc including information-recording layers as many as in the first embodiment, increases in mass-production costs according to the number of stamping steps can be suppressed by applying the present invention.

However, another method can be used instead to provide dimples and/or bumps. In this alternative method, for example, an information-recording layer is formed on a spacer layer using an existing disc-manufacturing process and a stamper as they are, and then stamping the surface of that information-recording layer using a dimpled and/or bumped stamper separately provided for the application of the present invention. In this method, since the information-recording layer itself is later dimpled and/or bumped using the separate stamper, the die and stamping steps required for the dimpling and/or bumping operations become extra necessities in addition to the necessities of the existing disc-manufacturing process. At the same time, however, the alternative method has a feature in that a conventional die for spacer layers can be used intact during the formation of the spacer layer.

Second Embodiment

Next, a second embodiment of the present invention will be described using the accompanying drawings.

As described in the first embodiment, the influences of the non-intended layer light in a multilayer optical disc arise from the fact that a plurality of different beams from the reflecting layers interfere with each other according to the particular relationship in phase between the layers.

In the first embodiment, therefore, the layout pitch between the first information-recording layer and the second information-recording layer is controlled to actively cause interference, then the signal fluctuation frequency of the layout pitch is further controlled to make confinable the interference frequency formerly unconfinable, and the confinable interference frequency is changed to a specific frequency range that minimizes any effects of the interference upon the operation of the optical disc drive.

In the present (second) embodiment, however, the shape of the information-recording layer surface is formed so that the non-intended layer light itself includes multiple beams of light reflected with different phases. Thus, these multiple beams reflected from the non-intended layers to generate the non-intended light interfere with each other to reduce total intensity of the beams reflected from the non-intended layers and thus to suppress the influences of the non-intended layer light interfering with the intended light.

In this case, since the intensity is reduced by the mutual interference between the non-intended layer beams of light themselves, mutual phase differences between the non-intended layer light and the intended light can be arbitrary. Additionally, for this reason, the phase fluctuation frequency of the light reflected from the non-intended layers does not always need to be controlled to fall outside the frequency bands of the signals required in the optical disc drive. Of course, the phase fluctuation frequency of the light reflected from the non-intended layers can be controlled to fall outside the frequency bands of the signals required in the optical disc drive.

Next, a description will be given of a method for conducting control so that a plurality of beams having different phases to form non-intended layer light will interfere with each other to reduce the intensity of the light reflected from a second information-recording layer.

Figure 4:
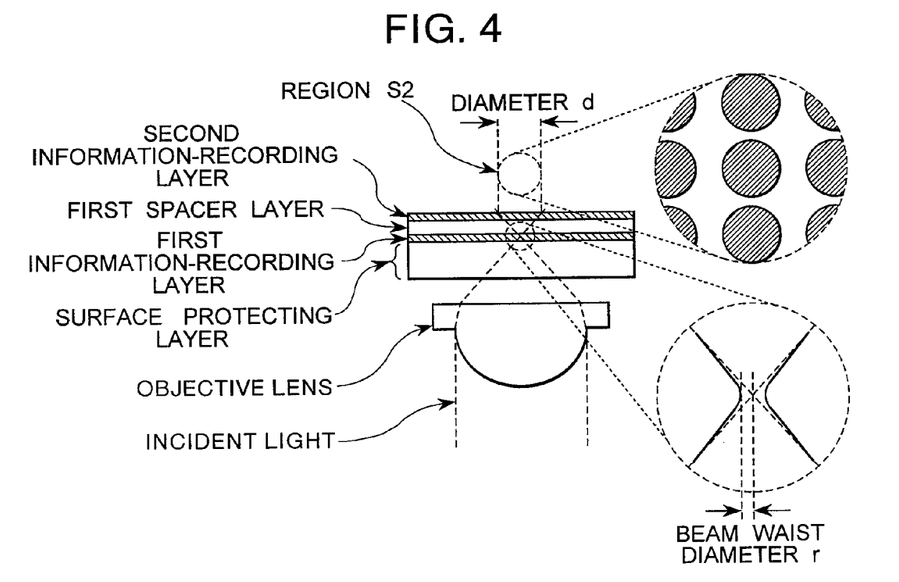
FIG. 4 is a schematic diagram illustrating a size of an optical spot which non-intended layer light forms in a second embodiment.

FIG. 4 is a schematic diagram illustrating a size of an optical spot which non-intended layer light forms in the second embodiment. For the simplicity of description, two information-recording layers (i.e., an intended layer that is a first information-recording layer, and a non-intended layer that is a second information-recording layer) are taken as an example in the second embodiment.

Assume that servo control for positioning in a focusing direction is conducted upon an objective lens to ensure that the first information-recording layer is focused. A portion of the light emitted to the first information-recording layer is reflected therefrom and then returned to the objective lens. Another portion of the light passes through the first information-recording layer and further passes through a spacer layer to reach the second information-recording layer. The portion of the light that has reached the second information-recording layer is reflected therefrom and then returned to the objective lens. Therefore, both the light that has been reflected from the first information-recording layer, and the light that has been reflected from the second information-recording layer enter the objective lens.

Let a light-irradiated region on the first information-recording layer be expressed as S1, and a light-irradiated region on the second information-recording layer, as S2. Even when a movement of the optical spot due to disc rotation or the like moves the regions S1 and S2, the reflected light can be stably reduced by assigning an area ratio of nearly 1:1 between a dimpled section and bumped section of the corresponding reflection surface and minimizing any changes in area ratio due to the movements of the regions. To this end, a large number of dimples and bumps are arranged in the region S2 so that the dimples and/or the bumps substantially equal each other in sums of respective areas.

Because of the first information-recording layer being in focus, the light-irradiated region S1 thereon has an extremely small area close to a diffraction limit. More specifically, if a beam waist is present on the first information-recording layer, since a wavelength ($\lambda$) of 0.405 μm and a numerical aperture (NA) of 0.85 are obtainable in a Blu-ray two-layer disc, an approximate radius "r" of the beam waist is $$r = 0.32 \times (\lambda/NA) = 0.15 \text{ μm} \quad \text{(Expression 1).}$$

In addition, an area "s" of the circular region S1 (not shown) that is formed at the radius "r" is $$s = \pi r^2 = 0.073 \text{ μm}^2 \quad \text{(Expression 2).}$$

A size of the light-irradiated region S2 on the second information-recording layer is determined by a distance between the first information-recording layer and the second information-recording layer, that is, by thickness Ts of the spacer layer and the NA of the objective lens. Upon applying Ts=25 μm in the Blu-ray two-layer disc and supposing that S2 is a circle with a radius d/2, one obtains $$d/2 = Ts \times \tan(\sin^{-1}(NA)) = 40 \text{ μm} \quad \text{(Expression 3).}$$

An area S of the region S2 is $$S = \pi (d/2)^2 = 5112 \text{ μm}^2 \quad \text{(Expression 4).}$$

A diametral ratio between the regions S1 and S2 amounts to as much as 267 times, and an area ratio amounts to as much as 70,000 times.

Accordingly, stable reduction of the reflected light can be achieved if appropriately sized dimples and/or bumps are arranged in S2 so that a sufficient number of dimples and/or bumps exist therein. It just suffices for sizes L1 and L2 required of each dimple and bump, respectively, to be substantially the same as or less than the radius (d/2) of the region S2, for example. For example, if the foregoing equally pitched arrangement of the same-sized dimples and/or bumps is used to ensure that L1=L2=(d/2)=40 μm, about eight dimples and/or bumps on the average will exist in S2. With dimples and/or bumps as many as this, fluctuations in the intensity of the light reflected from the second information-recording layer can be suppressed and stably reduced.

As the sizes L1 and L2 of the dimples and/or the bumps become small, the sums of the respective areas of the dimples and bumps in S2 generally decrease in fluctuation ratio. The sizes of the dimples and the bumps, however, are restricted under other conditions set forth below.

Consider a case in which the intended layer is the second information-recording layer and the non-intended layer is the first information-recording layer. In this case, since the dimples and/or bumps in the foregoing example are pitched so that L1=L2=40 μm, the dimples and/or bumps measuring nearly 20 μm in length exist on the surface of the second information-recording layer in contact with the spacer layer.

In Blu-ray disc specifications, information-recording pits are about 0.13 μm in diameter and track groove pitches are about 0.32 μm wide, so the dimples and/or bumps nearly 20 μm in length are sufficiently large for those sizes and both hardly affect each other to pose a problem. Reducing the sizes of the dimples and the bumps too significantly, however, often causes a situation in which both counteract each other.

The types of problems liable to occur depend upon conditions. However, a disturbance in servo control at a boundary between a dimple and a bump, deterioration in error rate due to superimposition of low-frequency components upon the reproduction signal, or other problems are estimated to arise. There is a need, therefore, to determine L1 and L2 in a range that does not cause these problems. In the case that these problems are estimated to occur, the filter for removing the frequency components that cause the problems may, if necessary, be disposed in the servo control signal circuit and/or the reproduction signal circuit similarly to the first embodiment.

While an optical disc with two information-recording layers has been taken as an example in the present embodiment, the mutual relationships in position among the dimpled and/or bumped information-recording layers are not specified and are arbitrary. That is to say, dimples and/or bumps may need only to exist on at least one information-recording layer.

For example, in an optical disc with three information-recording layers, if dimples and/or bumps exist on one information-recording layer only and do not exist on the other two information-recording layers, this state is undesirable since interference occurs between the beams reflected from the non-dimpled/bumped information-recording layers. It is desirable, therefore, that non-dimpled/bumped information-recording layer should be maximum one and that any one of layer set combinations of two information-recording layers containing at least one dimpled/bumped information-recording layer. In another method, even if at least two non-dimpled and/or bumped information-recording layers are present, the magnitude of the interference can be reduced by disposing a non-dimpled/bumped information-recording layer so as to increase the layout spacing of those non-dimpled/bumped information-recording layers. In an optical disc with three information-recording layers, for example, a dimpled and bumped information-recording layer is disposed vertically as a middle layer of the three information-recording layers, and non-dimpled/bumped information-recording layers are disposed as the remaining upper and lower information-recording layers. Arranging the information-recording layers in this way extends the spacing between the two non-dimpled/bumped information-recording layers in which the interference easily occurs. Since the extension of the spacing increases the area of each information-recording layer reflecting the interfering light, the energy density of the interfering light on the surface of the photodetector decreases, which results in reduced influences of the interference.

Next, a method in which a usage form appropriate for the present embodiment can be realized by discriminating between an optical disc that applies the embodiment, and an optical disc that does not apply the embodiment, will be described.

First, discrimination information for discriminating an optical disc applicable to the embodiment is recorded on a predetermined information-recording region of the optical disc in a form readable to the optical disc drive. The manufacturer of the optical disc commonly records the discrimination information before shipping the disc.

A method of recording the discrimination information is not limited to the above. For example, in an optical disc drive that has the corresponding optical disc mounted therein and is adapted for recording information on the disc, after the optical disc drive has recognized the optical disc applying the present embodiment, the discrimination information may be recorded in the predetermined information-recording region of the optical disc in appropriate timing in the form readable to the optical disc drive. In this case, the optical disc drive uses an arbitrary method to recognize that the optical disc mounted in the drive is that to which the embodiment is applied. However, the optical disc drive can judge, for example, from the frequencies, levels, or other factors of the characteristic signals of the embodiment that are generated according to the particular dimpled and/or bumped shape of the information-recording surface.

The information-recording region on the optical disc where the discrimination information is recorded is, for example, a region in which management information of the optical disc is recorded.

In addition, the discrimination information recorded in the information-recording region relates to dimples and/or bumps and includes, for example, at least one of the following information:

(1) information intended to discriminate whether the optical disc includes dimples and/or bumps, and relating to (a) presence of at least one dimpled and/or bumped information-recording surface on the optical disc, or (b) presence of no dimpled or bumped information-recording surfaces;

(2) information intended to discriminate a dimpled and/or bumped information-recording surface from a plurality of information-recording surfaces, and including a layer characteristic number and other layer-discriminating information relating to either (a) a dimpled and/or bumped information-recording layer, or (b) a non-dimpled and/or bumped information-recording layer; and (3) information relating to characteristics of the filter for separating the signal frequencies generated by the presence of dimples and/or bumps, and more particularly, to (a) sizes and layout pitches of the dimples and/or the bumps, or (b) the signal frequencies or signal periods generated at specific speeds of the optical disc by the presence of the dimples and/or the bumps.

Next, the form in which the discrimination information is recorded on the optical disc that applies the present embodiment is described below. Similarly to the first embodiment, the information-recording region where the discrimination information is recorded can be, for example, a burst cutting area, a lead-in section, a read-out section, a user data section, or the like. For the same reasons as in the first embodiment, however, recording in either the burst cutting area, the lead-in section, or the read-out section is desirable. The layout, contents, and other items of the discrimination information actually recorded in the burst cutting area and the lead-in section are also the same as those described in the first embodiment using FIGS. 6 and 7.

Third Embodiment

Next, a third embodiment of the present invention will be described using the accompanying drawings.

Figure 5:
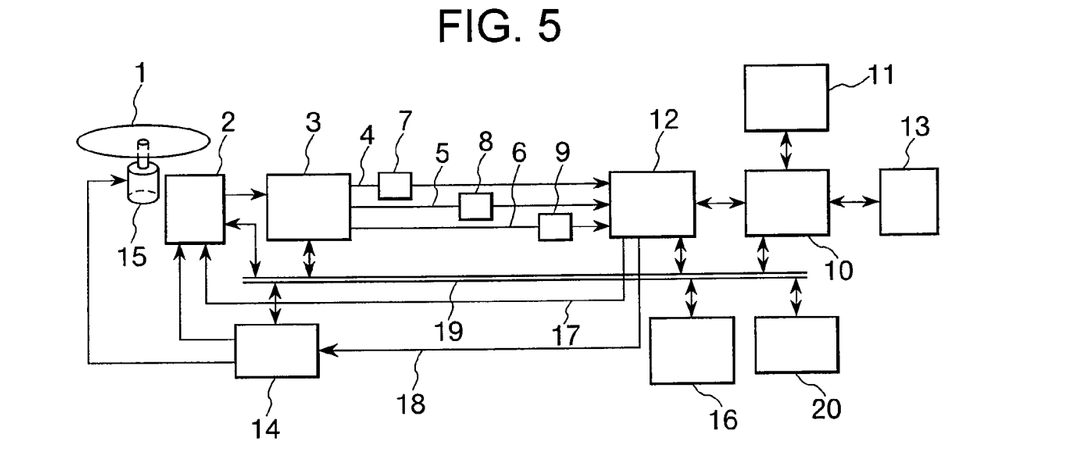
FIG. 5 is a block diagram of the optical disc drive adapted to a multilayer optical disc in a third embodiment.

The third embodiment is an optical disc drive suitable for the multilayer optical disc of the present invention. FIG. 5 is a block diagram of the optical disc drive adapted to the multilayer optical disc of the invention, the optical disc drive being suitable for recording information on the multilayer optical disc or for reproducing recorded information therefrom.

Basic operation for reproducing information from the optical disc is first described below.

A signal that has been detected from the optical disc 1 via an optical pickup 2 is input to a front-end circuit 3. The front-end circuit 3 primarily conducts analog signal processing to generate a servo signal 4, a reproduction RF signal 5, and the like. Hereinafter, a focusing servo signal and a tracking servo signal are collectively called the servo signal. Both servo signals are also shown in collective form in related drawings. After removal of unnecessary signal components by a filter 7, the servo signal 4 that has been output from the front-end circuit 3 is input to a reproducing/recording/servo signal processing circuit 12. The reproducing/recording/servo signal processing circuit 12 conducts A/D conversion and digital signal processing upon the servo signal to generate a servo-driving signal 18. The servo-driving signal 18 is input to a driver circuit 14. The driver circuit 14 conducts power amplification and/or others to drive an internal actuator (not shown) of the optical pickup 2, a motor (not shown) that moves the entire optical pickup, and a motor 15 for rotating the optical disc 1. The reproduction RF signal 5 is also cleared of unnecessary signal components by a filter 8 before being input to the reproducing/recording/servo signal processing circuit 12. The reproducing/recording/servo signal processing circuit 12 conducts A/D conversion, clock synchronizing, equalizing, signal demodulation, error correction processing, and/or others, upon the input reproduction RF signal, thus decoding the data that has been recorded on the optical disc. The decoded data is input to an interface circuit 10, then undergoes buffering via a buffer memory 11, interfacing to an external device in accordance with a predetermined interface protocol such as ATA or Serial-ATA, and/or other processing, and is transmitted to the external device 13. Thus, information that has been reproduced from the optical disc is transmitted to the external device. In addition, a microcomputer 16 within the optical disc drive executes the information reproduction process by controlling related functional blocks via a microcomputer bus 19.

Basic operation for recording information on the optical disc is next described below.

The signal that has been detected from the optical disc 1 via the optical pickup 2 is input to the front-end circuit 3. The front-end circuit 3 primarily conducts analog signal processing to generate the servo signal 4, a wobble signal 6, and the like. After removal of unnecessary signal components by the filter 7, the servo signal 4 that has been output from the front-end circuit 3 is input to the reproducing/recording/servo signal processing circuit 12. The reproducing/recording/servo signal processing circuit 12 conducts A/D conversion and digital signal processing upon the servo signal to generate the servo-driving signal 18. The servo-driving signal 18 is input to the driver circuit 14. The driver circuit 14 conducts power amplification and/or others to drive the internal actuator (not shown) of the optical pickup 2, the motor (not shown) that moves the entire optical pickup, and the motor 15 for rotating the optical disc 1. The wobble signal 6 is also cleared of unnecessary signal components by a filter 9 before being input to the reproducing/recording/servo signal processing circuit 12. The reproducing/recording/servo signal processing circuit 12 conducts A/D conversion, clock synchronizing, signal demodulation, error correction processing, and/or others, upon the input wobble signal, thus decoding address information, media information, and other data existing on the optical disc. In addition, the wobble signal is input to an internal recording clock generator (not shown) and serves as a basis to generate reference clock timing for recording information on the optical disc. Data that is to be recorded on the optical disc is input from the external device 13 to the interface circuit 10, then undergoes buffering via the buffer memory 11, interfacing to the external device in accordance with the predetermined interface protocol such as ATA or Serial-ATA, and/or other processing, and is transmitted to the reproducing/recording/servo signal processing circuit 12. The reproducing/recording/servo signal processing circuit 12 conducts an error correction code addition, scrambling, encoding, synchronizing with a recording clock, conversion into a recording strategy, etc. upon the input data, and then transmits a recording signal 17 to the optical pickup 2 in order to record the data on the optical disc. A laser driver (not shown) that drives a semiconductor laser (not shown) of the optical pickup 2 emits semiconductor laser light at a required light-emitting power level in required timing in response to the recording signal 17 and records information on the optical disc. Thus, information that has been input from the external device is recorded on the optical disc. In addition, the microcomputer 16 within the optical disc drive reproduces the information by controlling related functional blocks via the microcomputer bus 19.

The present embodiment is characterized in that filters for reducing any influences of signals of a specific frequency band upon the optical pickup detection signal arising from the dimpled and/or bumped structure of the information-recording layer surface that is the characteristic feature of the multilayer disc of the present invention, described in the first embodiment, are provided in a conventional optical disc drive. In the present embodiment, the filters 7, 8, and 9 in FIG. 5 are the filters provided for the above purpose.

In the present embodiment, although there are some differences in degree, the signal arising from the presence of dimples and/or bumps on the information-recording layer surface is superimposed upon the servo signal 4, reproduction RF signal 5, wobble signal 6, and other signals optically detected from the multilayer optical disc.

As previously described herein, in the present invention, frequencies are assigned so that the frequency bands of the superimposition signals based upon dimples and/or bumps do not overlap the frequency bands of other necessary signals. If these superimposition signals present operation-associated problems, therefore, using the frequency filters for reducing the levels of the superimposition signals allows only the superimposition signal levels to be reduced without affecting the levels of the servo signal, reproduction RF signal, wobble signal, and other signals originally involved. While the present embodiment includes superimposition component reduction filters for the servo signal, the reproduction RF signal, and the wobble signal, the use of the superimposition component reduction filters is not limited to the three kinds of signals and if necessary, superimposition component reduction filters may be added for other signals, or if a superimposition component reduction filter is unnecessary, each related signal line may be bypassed instead of being filtered. Characteristics of the superimposition component reduction filters do not need to be fixed at or limited to specific ones, either, and the filter characteristics and an order of magnitude of each filter can be set and/or modified as appropriate with an operating speed of the optical disc drive (i.e., the optical disc speed), cutoff characteristics required of the filter, as-passed group delay characteristics of necessary signals, and other factors taken into account.

Next, filter handling required when the optical disc drive changes a recording or reproducing rate is described below. In optical disc drives, the rate at which information is to be recorded or reproduced is often changed considering a state of the optical disc, restrictions on the operation of the disc drive, and other factors. The change of the recording or reproducing rate is effected by changing a speed of the motor 15 which rotates the optical disc 1. In that case, when the rate which the optical spot on the optical disc moves along the information-recording layer of the optical disc changes, the superimposition signals based upon dimples and/or bumps also change in frequency. To obtain substantially the same characteristics as before the rate change, therefore, the frequency characteristics of the filters for reducing the superimposition signal levels also need to be changed according to the particular rate change. Accordingly if the rate change is necessary, it is desirable that the filters 7 to 9 be capable of changing the frequency characteristics. For this reason, digital filters are desirable as the filters 7 to 9 so that the frequency characteristics can be changed by setting appropriate filtering coefficients. This can be achieved by, for example, arranging digital filters 7 to 9 in an internal digital signal-processing block of the reproducing/recording/servo signal processing circuit 12.

In addition to the above, a variety of processes and circuits for tilt servo control, spherical aberration correction control, access control, BCA (burst cutting area) information and/or ID information demodulation, writing tests for determining the recording power level required, authentication for copyright protection, and encryption key exchange, operate in linked form during information recording/ reproduction in actual optical disc drives. Description of these elements, however, is omitted since none of them has a direct relationship with the present invention.

The optical disc drive of the present embodiment discriminates whether the mounted optical disc is an optical disc that applies the first embodiment of the present invention, and then conducts the appropriate setup for the particular optical disc. A method in which these functions are performed is described below.

Assume a case in which discrimination information is recorded in a predetermined information-recording region of the optical disc in a form readable to the optical disc drive in order to discriminate whether the optical disc is adapted to the present embodiment. First, the predetermined information-recording region on the optical disc where the discrimination information is recorded is accessed for reading the discrimination information. The information-recording region on the optical disc where the discrimination information is recorded is, for example, a region in which management information of the optical disc is recorded.

Next, the discrimination information recorded in the information-recording region is read out. The discrimination information relates to dimple and/or bump states and associated conditions, and includes, for example, at least one of the following information:

(1) information intended to discriminate whether the optical disc includes dimples and/or bumps, and relating to
(a) presence of at least one dimpled and/or bumped information-recording surface on the optical disc, or
(b) presence of no dimpled or bumped information-recording surfaces;
(2) information intended to discriminate a dimpled and/or bumped information-recording surface from a plurality of information-recording surfaces, and including a layer characteristic number and other layer-discriminating information relating to either
(a) a dimpled and/or bumped information-recording layer, or
(b) a non-dimpled and/or bumped information-recording layer; and
(3) information relating to characteristics of the filter for separating the signal frequencies generated by the presence of dimples and/or bumps, and more particularly, to
(a) sizes and layout pitches of the dimples and/or the bumps, or
(b) the signal frequencies or signal periods generated at specific velocities of the optical disc by the presence of the dimples and the bumps.

Data that includes the region in which the above information is recorded is read from the optical disc in a way similar to the data-reproducing method described above, and then after decoding, the necessary discrimination information is obtained. The thus-obtained discrimination information is processed by the microcomputer 16 and then stored into an internal memory 20 of the optical disc drive as necessary. Based upon the discrimination information, necessary data on an internal configuration of the optical disc drive is also assigned. The necessary data referred to here includes, for example, data settings concerning the filters 7 to 9 for removing the frequency components of the above-described superimposition signals generated by the presence of dimples and/or bumps.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An optical disc comprising:
a first information-recording layer and a second information-recording layer; and
a spacer layer disposed between the first information-recording layer and the second information-recording layer such that an interlayer distance between the first information-recording layer and the second information-recording layer is within a predetermined range, wherein:
the spacer layer is constructed to have a substantially definite thickness and to include dimples and/or bumps in a direction of the thickness on the spacer surface, and
a period of the dimples and/or bumps in the spacer surface is such that signal fluctuation frequencies due to the dimples and/or bumps which occur in a servo signal or reproduction RF signal detected by an optical disc drive when the optical disc is mounted therein and rotates at a predetermined speed will fall outside a servo signal frequency band or reproduction RF signal band of the optical disc drive.

2. The optical disc according to claim 1, wherein:
the thickness of the spacer layer is greater than a wavelength of light used for reproducing or recording information on the optical disc.

3. The optical disc according to claim 1, wherein:
a size of each of the dimples and/or bumps on the spacer layer is smaller than a wavelength of light used for reproducing or recording information on the optical disc.

4. The optical disc according to claim 1, wherein:
the thickness of the spacer layer is greater than a wavelength of light used for reproducing or recording information on the optical disc; and
a depth of each of the dimples and/or a height of each of the bumps on the spacer layer is smaller than the wavelength of the light used for reproducing or recording the information on the optical disc.

5. The optical disc according to claim 1, wherein the number of the information-recording layers is at least three and the number of the spacer layers is at least two.

6. The optical disc according to claim 1, wherein the dimples and/or bumps present on the spacer layer have a substantially periodic structure in a plane, with the period being within a predetermined range.

7. The optical disc according to claim 1, wherein information on the existence of the dimples and/or bumps on the spacer surface is recorded in a readable signal.

8. An optical disc comprising:
a first information-recording layer and a second information-recording layer; and
a spacer layer disposed between the first information-recording layer and the second information-recording layer such that an interlayer distance between the first information-recording layer and the second information-recording layer is within a predetermined range, wherein:
the spacer layer is constructed to have a substantially definite thickness and to include dimples and/or bumps in a direction of the thickness on the spacer surface, and
a size of each of the dimples and/or bumps on the spacer layer is smaller than a wavelength of light used for reproducing or recording information on the optical disc.

9. An optical disc comprising:
a first information-recording layer and a second information-recording layer; and
a spacer layer disposed between the first information-recording layer and the second information-recording layer such that an interlayer distance between the first information-recording layer and the second information-recording layer is within a predetermined range, wherein:
the spacer layer is constructed to have a substantially definite thickness and to include dimples and/or bumps in a direction of the thickness on the spacer surface,
the thickness of the spacer layer is greater than a wavelength of light used for reproducing or recording information on the optical disc, and
a depth of each of the dimples and/or a height of each of the bumps on the spacer layer is smaller than the wavelength of the light used for reproducing or recording the information on the optical disc.

10. An optical disc comprising:
a first information-recording layer and a second information-recording layer; and
a spacer layer disposed between the first information-recording layer and the second information-recording layer such that an interlayer distance between the first information-recording and the second information-recording layer is within a predetermined range, wherein:

the spacer layer is constructed to have a substantially definite thickness and to include dimples and/or bumps in the direction of the thickness on the spacer surface, and a period of the dimples and/or bumps in the spacer surface is such that signal fluctuation frequencies due to the dimples and/or bumps which occur in a servo signal or reproduction RF signal detected by an optical disc drive when the optical disc is mounted therein and rotates at a predetermined speed will fall outside a servo signal frequency band and reproduction signal band, respectively, of the optical disc drive.

11. An optical disc comprising:

a first information-recording layer and a second information-recording layer; and a spacer layer disposed between the first information-recording layer and the second information-recording layer such that an interlayer distance between the first information-recording layer and the second information-recording layer is within a predetermined range, wherein:

the spacer layer is constructed to include dimples and/or bumps in a direction of a thickness on the spacer surface, and a pitch of the dimples and/or bumps in the spacer surface is different from a track pitch of the first and/or the second information-recording layer.

12. An optical disc comprising:

a first information-recording layer and a second information-recording layer; and a spacer layer disposed between the first information-recording layer and the second information-recording layer such that an interlayer distance between the first information-recording layer and the second information-recording layer is within a predetermined range, wherein:

the spacer layer is constructed to include dimples and/or bumps in a direction of a thickness on the spacer surface, and a layout of the dimples and/or bumps in the spacer surface is a polygonal arrangement with the dimples and/or bumps arranged at vertexes of a polygon or a random arrangement.

13. An optical disc drive adapted to accommodate the optical disc of claim 1, comprising a filter provided on a signal route for reducing frequency components, the frequency components occurring due to the dimples and/or bumps of the spacer layer of the optical disc.

* * * * *